(12) United States Patent
Oderaotoshi et al.

(10) Patent No.: US 8,393,263 B2
(45) Date of Patent: Mar. 12, 2013

(54) FOOD DOUGH EXTENDING APPARATUS

(75) Inventors: Takeshi Oderaotoshi, Kanuma (JP); Tomokuni Akutsu, Nasukarasuyama (JP); Hiroyuki Okaizumi, Tochigi (JP); Norio Kobayashi, Shimotsuke (JP)

(73) Assignee: Rheon Automatic Machinery Co., Ltd., Tochigi (JP)

( * ) Notice: Subject to any disclaimer, the term of this patent is extended or adjusted under 35 U.S.C. 154(b) by 499 days.

(21) Appl. No.: 12/708,817

(22) Filed: Feb. 19, 2010

(65) Prior Publication Data

US 2010/0224082 A1   Sep. 9, 2010

(30) Foreign Application Priority Data

Mar. 6, 2009   (JP) .................................. 2009-053108

(51) Int. Cl.
*A21C 3/00*   (2006.01)
*A21C 3/02*   (2006.01)
*A21C 11/00*   (2006.01)
*A23P 1/00*   (2006.01)

(52) U.S. Cl. .......... 99/349; 99/353; 99/450.1; 99/450.2; 425/238; 426/496

(58) Field of Classification Search ................ 99/450.1, 99/450.2, 349, 353; 425/98, 227, 238; 426/496, 426/502, 503, 518
See application file for complete search history.

(56) References Cited

U.S. PATENT DOCUMENTS

| | | | |
|---|---|---|---|
| 3,132,949 A * | 5/1964 | Crowe ........................... | 426/439 |
| 3,294,545 A * | 12/1966 | Cunningham et al. ........ | 426/560 |
| 3,680,474 A * | 8/1972 | Brown ............................ | 99/353 |
| 3,763,764 A * | 10/1973 | Schy .............................. | 99/353 |

(Continued)

FOREIGN PATENT DOCUMENTS

| CN | 2226376 Y | 5/1996 |
|---|---|---|
| JP | 54-11988 | 1/1979 |

(Continued)

OTHER PUBLICATIONS

U.S. Appl. No. 12/708,727 to Oderaotoshi et al., filed Feb. 19, 2010.

(Continued)

*Primary Examiner* — Sebastiano Passaniti
(74) *Attorney, Agent, or Firm* — Greenblum & Bernstein P.L.C.

(57) ABSTRACT

An object is to provide a food dough extending apparatus capable of adjusting a vertical position of an extending roller unit in an obliquely vertical direction in accordance with a thickness of food dough. A food dough apparatus includes an inclined transporting unit 7 inclined and configured to transport to-be-extended food dough 9 upward, a horizontal direction transporting unit 11 configured to transport the food dough 9 transported from the inclined transporting unit 7 in a horizontal direction, and an extending roller unit 13 provided above over an area from an upper end of the inclined transporting unit 7 to the horizontal direction transporting unit 11 and configured to extend the food dough 9. The extending roller unit 13 is vertically adjustable in a direction intersecting an inclination direction of the inclined transporting unit 7 and being upwardly inclined toward the inclined transporting unit 7. The extending roller unit 13 includes dust sealing mechanisms provided between ends of the extending rollers 79 and a pair of endless members 75, the dust sealing mechanism inhibiting circulation of air between rotation regions of extending rollers 79 and traveling regions of the pair of endless members 75.

5 Claims, 9 Drawing Sheets

U.S. PATENT DOCUMENTS

| | | | |
|---|---|---|---|
| 4,622,890 A * | 11/1986 | Swanson | 99/450.2 |
| 5,509,350 A * | 4/1996 | Askman et al. | 99/450.2 |
| 6,237,473 B1 | 5/2001 | Mirikawa | |
| 6,361,307 B1 * | 3/2002 | Bernhard et al. | 425/193 |
| 6,875,458 B2 * | 4/2005 | Dove et al. | 426/438 |
| 7,325,483 B2 * | 2/2008 | Szymanski | 99/349 |

FOREIGN PATENT DOCUMENTS

| | | |
|---|---|---|
| JP | 54-70488 | 6/1979 |
| JP | 59-224641 | 12/1984 |
| TW | 129898 | 3/1990 |

OTHER PUBLICATIONS

China Office action, dated Aug. 10, 2011 along with an english translation thereof.

Taiwan Office action, dated Jul. 30, 2012 along with an english translation thereof.

* cited by examiner

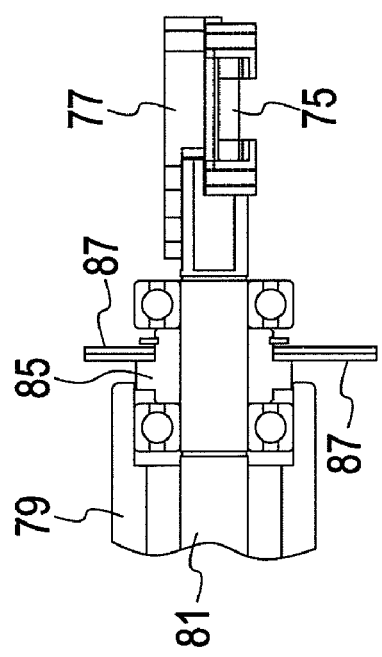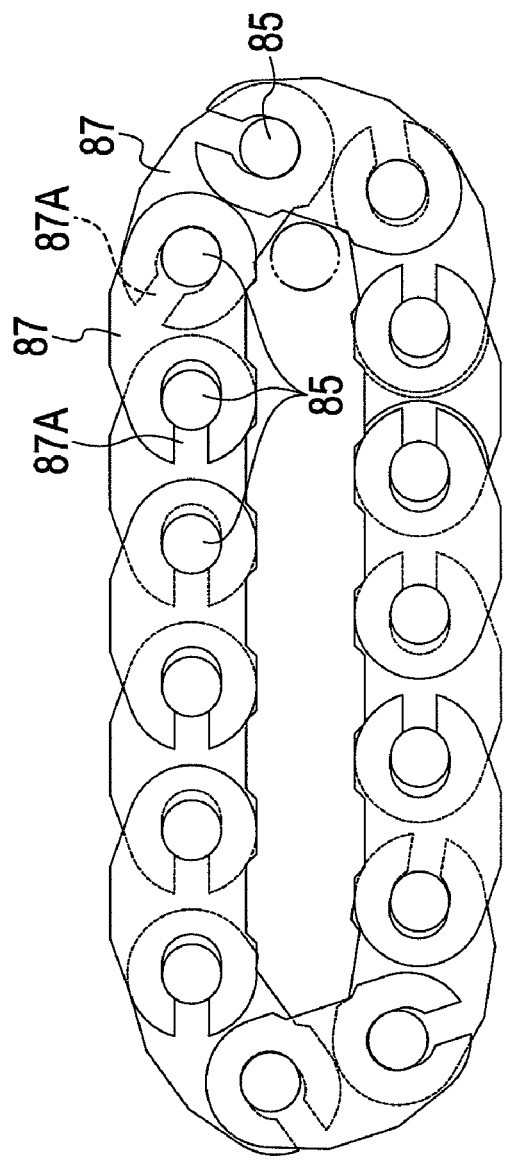

FOOD DOUGH EXTENDING APPARATUS

TECHNICAL FIELD

The present invention relates to a food dough extending apparatus including an extending area where thick food dough is extended into thin dough according to a thickness of the thick food dough, and a compressing and conveying area where the thick food dough is compressed from above and below and conveyed to the extending area, the apparatus being capable of, when an extending thickness in the extending area is adjusted, adjusting a length of the compressing and conveying area according to the adjustment of the extending thickness in the extending area.

BACKGROUND ART

When food dough such as cake dough or bread dough is extended into thin strip-shaped (sheet-shaped) food dough, thick food dough transported continuously by a transporting unit such as a belt conveyor is compressed between the transporting unit and an extending roller provided above the transporting unit to extend the food dough into thin food dough. To adjust the thickness of the food dough, the extending roller is simply moved in the vertical direction (see Patent Literature 1)

CITATION LIST

Patent Literature

[Patent Literature 1] Japanese Patent Application Laid-Open No. Sho 59-224641

SUMMARY OF INVENTION

Technical Problem

The configuration disclosed in the above-described Patent Literature 1 includes an inclined transporting unit inclined and configured to transport thick food dough upward, a horizontal direction transporting unit for transporting the food dough transported from the inclined transporting unit in a horizontal direction, and an extending roller unit provided above over an area from around an upper end of the inclined transporting unit to the horizontal direction transporting unit and configured to extend the food dough (see FIGS. 4 and 5 in the Patent Literature).

In addition, in order to adjust an extending thickness of the food dough, the extending roller unit is adjusted vertically, i.e., in up-and-down directions, whereby a clearance between the horizontal direction transporting unit and the extending roller unit is adjusted. Moreover, an angle of inclination of the inclined transporting unit is adjusted when a clearance between the extending roller unit and the inclined transporting unit is adjusted in accordance with the thickness of the thick food dough transported by the inclined transporting unit. In short, the conventional food dough extending apparatus requires two steps of adjustment. Therefore, there has been demand for a food dough extending apparatus that is easily adjustable.

Solution to Problem

The present invention has been made in view of the aforementioned conventional problems. It therefore is an object of the present invention to provides a food dough extending apparatus to feed a food dough to a clearance between an extending roller unit and a horizontal direction transporting unit easily and reasonably To achieve the object, according to a first aspect of the present invention, there is provided a food dough extending apparatus including: an inclined transporting unit inclined and configured to transport to-be-extended food dough upward; a horizontal direction transporting unit configured to transport the food dough transported from the inclined transporting unit in a horizontal direction; and an extending roller unit provided above over an area from around an upper end of the inclined transporting unit to the horizontal direction transporting unit and configured to extend the food dough, wherein the extending roller unit is vertically adjustable in a direction intersecting an inclination direction of the inclined transporting unit and being upwardly inclined toward the inclined transporting unit.

According to a second aspect of the present invention as it depending from the first aspect, there is provided the food dough extending apparatus, wherein the extending roller unit includes: pipe-shaped extending rollers rotatably provided respectively on a plurality of roller support shafts, both ends of each of the roller support shafts being connected to a pair of rotatably movable endless members, and dust sealing mechanisms provided between ends of the extending rollers and the pair of endless members, the dust sealing mechanisms inhibiting circulation of air between traveling regions of the extending rollers and traveling regions of the pair of endless members.

According to a third aspect of the present invention as it depending from the first or the second aspect, there is provided the food dough extending apparatus, wherein each of the dust sealing mechanisms includes: a plurality of link plates connected into an annular shape and each having both ends rotatably supported by two adjacent roller support shafts, respectively, among the plurality of roller support shafts; an outer guide member configured to guide an outer circumference of the annularly connected link plates; and an inner guide member configured to guide an inner circumference of the annularly connected link plates thereby the outer guide member and the inner guide member guide the annularly connected link plates so as to hold the annularly connected link plates from the outer circumference and the inner circumference of the annularly connected link plates.

According to a fourth aspect of the present invention as it depending from the one aspect among the first aspect to the third aspect, there is provided the food dough extending apparatus, wherein the extending roller unit is provided to be retractable toward the inclined transporting unit to uncover an upper side of the horizontal direction transporting unit.

According to a fifth aspect of the present invention as it depending from the one aspect among the first aspect to the fourth aspect, there is provided the food dough extending apparatus, further including: a swing conveyor provided downstream of the horizontal direction transporting unit so as to be swingable in a vertical direction, and configured to convey the extended food dough in a direction identical to the transportation direction of the food dough by the horizontal direction transporting unit; a swing guide member provided on a tip end of the swing conveyor so as to be swingable in the horizontal direction in order to lap the food dough conveyed from the swing conveyor onto a transport surface of a transporting unit for transporting the food dough in a direction intersecting the transportation direction of the food dough by the swing conveyor, the swing guide member including a lower end reciprocable in a direction being horizontal and intersecting a transportation direction of the transporting unit;

and a guide member configured to guide the lower end of the swing guide member in the horizontal direction.

Advantageous Effects of Invention

According to the present invention, the position of the extending roller unit is adjusted in an inclination direction. Hence a protruding length of the extending roller unit toward the inclined transporting unit as well as a vertical position of the extending roller unit are adjusted at the same time by adjusting a clearance between the horizontal direction transporting unit and the extending roller unit into an appropriate clearance in accordance with the thickness of the food dough transported upward by the inclined transporting unit. Therefore, it is possible to adjust the clearance between the inclined transporting unit and an upstream end of the extending roller unit in accordance with the thickness of the food dough transported by the inclined transporting unit, and thereby to extend the thick food dough in a longer range before feeding the food dough into the clearance between the extending roller unit and the horizontal direction transporting unit. As a consequence, it is possible to feed the food dough to the clearance between the extending roller unit and the horizontal direction transporting unit easily and reasonably.

BRIEF DESCRIPTION OF DRAWINGS

FIG. 7 is an explanatory view showing a configuration of link plates.

DESCRIPTION OF EMBODIMENTS

Figure 1:
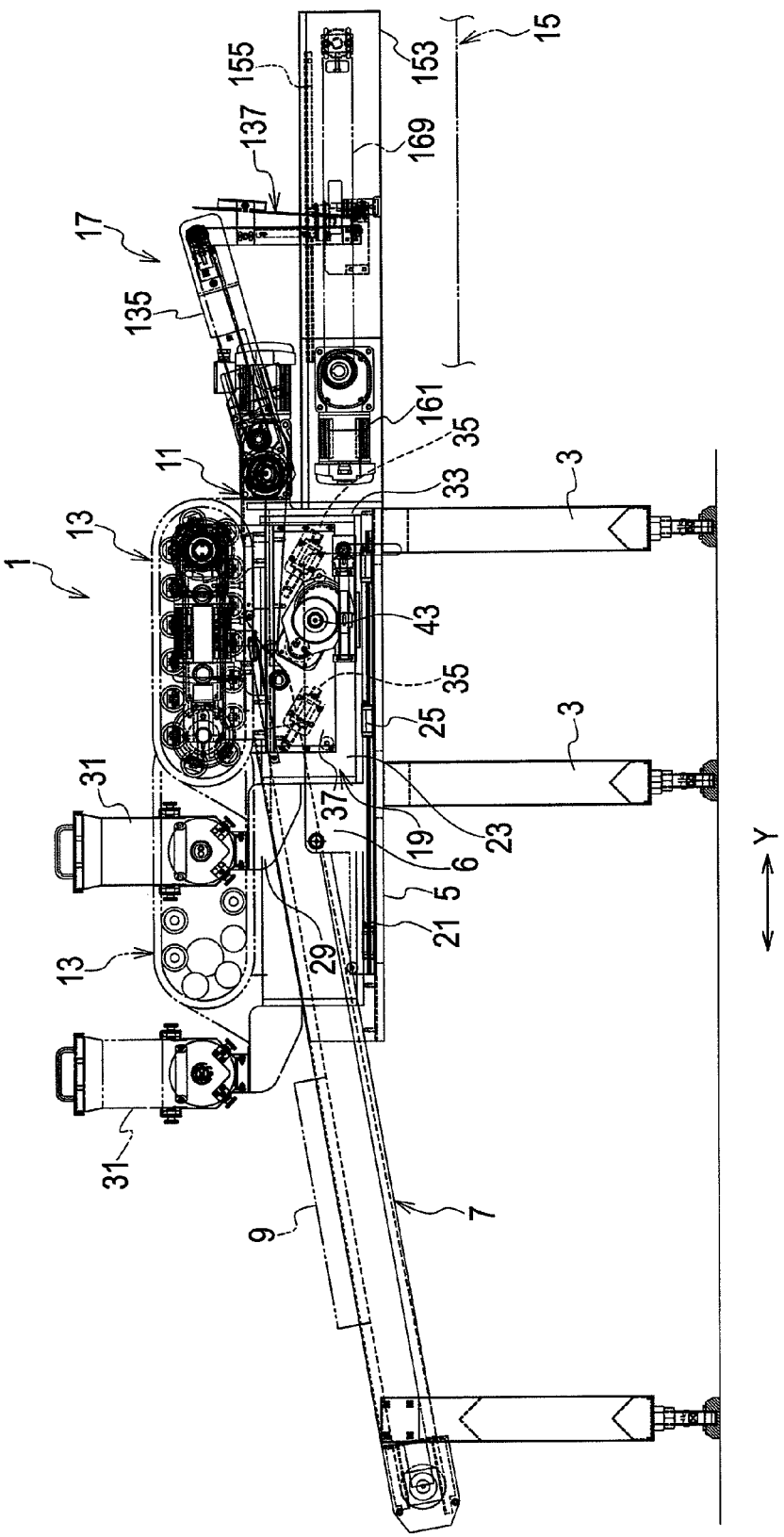
FIG. 1 is an explanatory left side view showing an overall configuration of a food dough extending apparatus.
Figure 2:
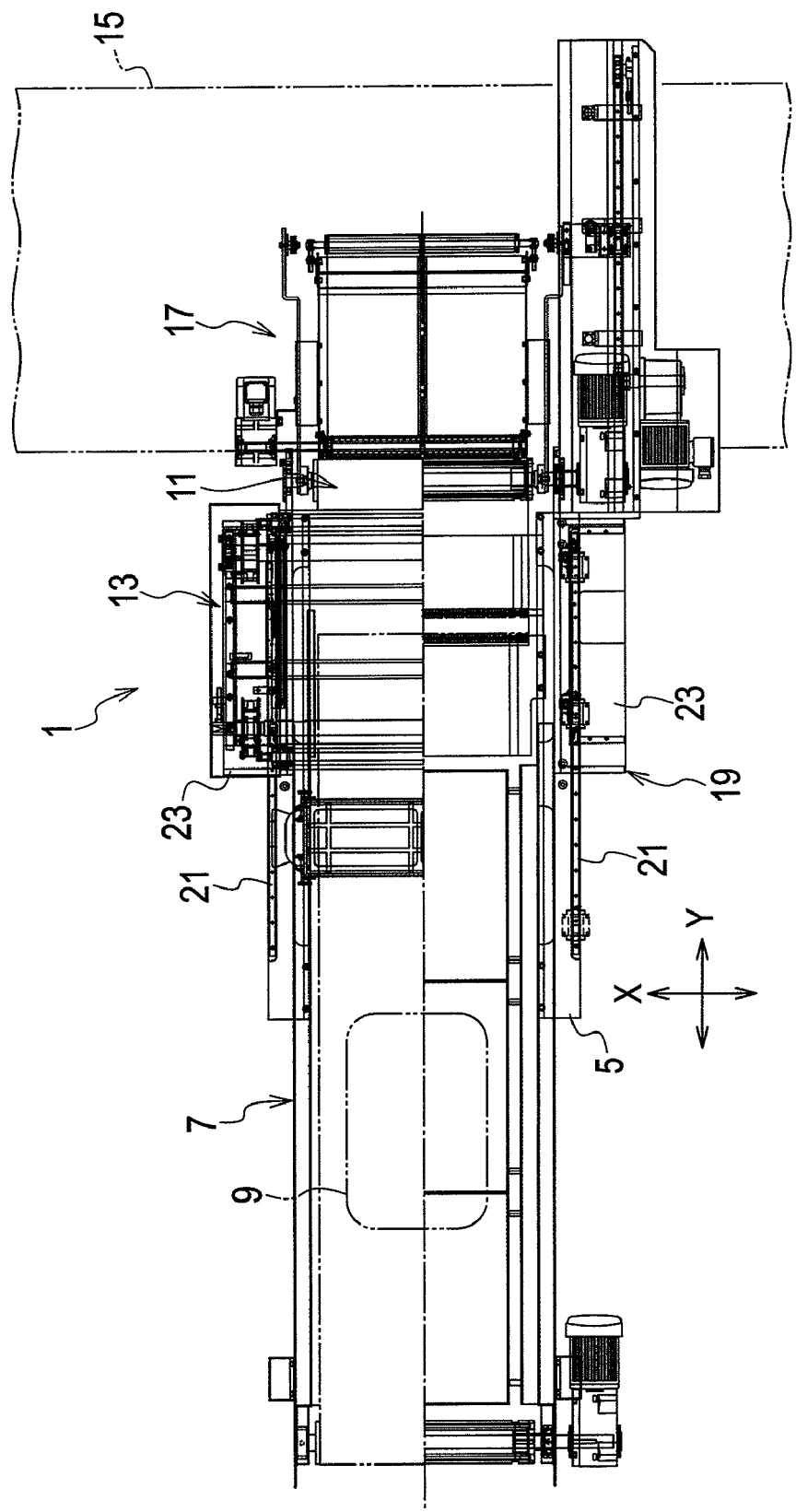
FIG. 2 is an explanatory plan view showing the overall configuration of the food dough extending apparatus.

There will be detailed below the preferred embodiments of the present invention with reference to the accompanying drawings. Like members are designated by like reference characters.

As shown in FIG. 1, a food dough extending apparatus 1 includes a rectangular base plate 5 supported horizontally by multiple legs 3, and a conveyor supporting member 6 is provided at a central part in a left-right direction (which is a vertical direction with respect to a sheet surface in FIG. 1: an X-axis direction) of this base plate 5. Moreover, an upper end of an inclined transporting unit 7 extending in a front-rear direction (a Y-axis direction) and being inclined so as to locate a front side higher than a rear side (on the left side in FIG. 1), is connected to this conveyor supporting member 6. This inclined transporting unit 7 is formed of a general belt conveyor, for example, and has a function to transport (convey) thick food dough 9 to be extended to an upward direction.

A horizontal direction transporting unit 11 for transporting the food dough 9 transported by the inclined transporting unit 7 horizontally in a forward direction (in a rightward direction in FIG. 1), is provided at a position on the base plate 5 corresponding to the upper end (a transport terminal end) of the inclined transporting unit 7. This horizontal direction transporting unit 11 is formed of a general belt conveyor, for example, and has a function to transport (convey) the strip-shaped (sheet-shaped) food dough 9 after being extended into the thin form by an extending roller unit 13 to the forward direction.

When viewed in a conveyance direction of the food dough 9, a lapping apparatus 17 for lapping the food dough 9 after being extended into the thin form by the extending roller unit 13 is provided on a transport surface of a transporting unit 15 for transporting the food dough 9 in a direction (the left-right direction: the X-axis direction) intersecting the conveyance direction (the front-rear direction: the Y-axis direction) of the food dough 9 on a downstream side (the front side: the right side in FIG. 1) of the horizontal direction transporting unit 11.

The extending roller unit 13 is configured to extend the thick food dough 9 transported to the horizontal direction transporting unit 11 by the inclined transporting unit 7 into the thin form. This extending roller unit 13 is provided on a slide stand 19 so as to be vertically adjustable, the slide stand 19 provided movably in the front-rear direction on the base plate 5.

Figure 4:
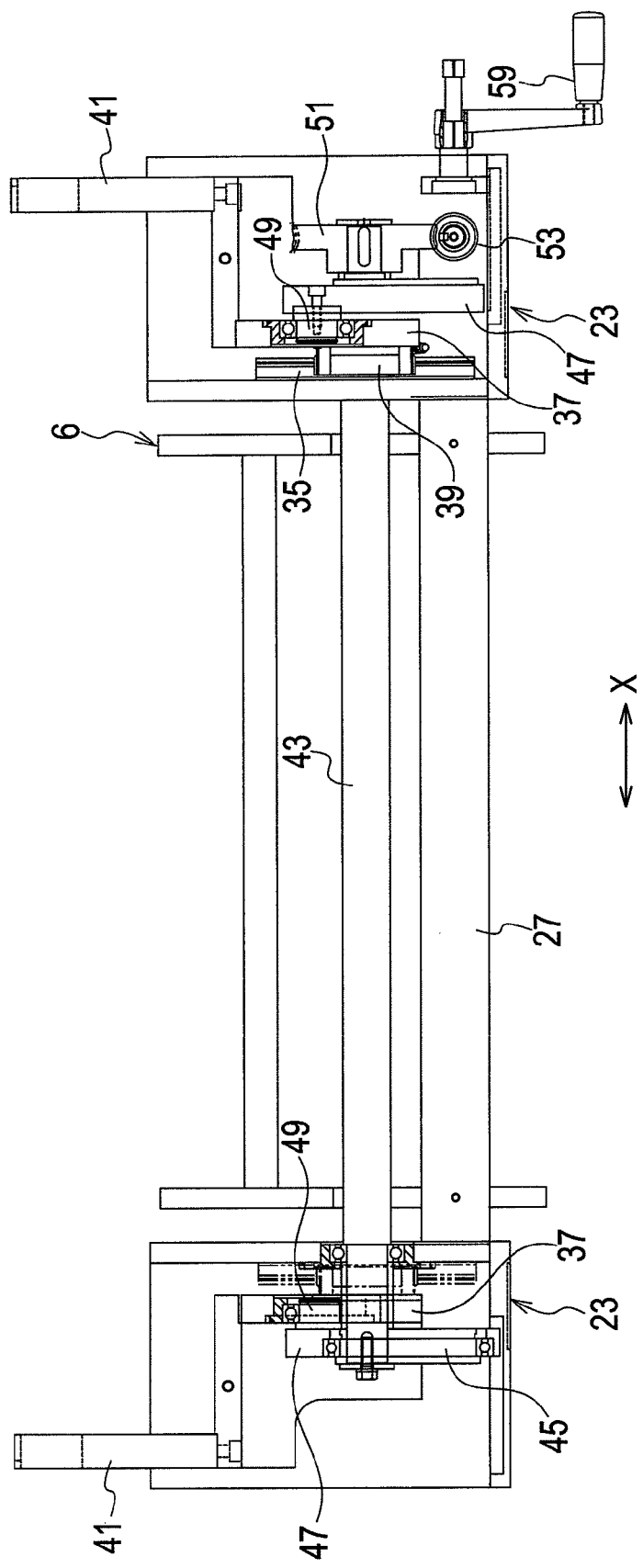
FIG. 4 is a vertical sectional view of the main part showing the configuration for adjusting the position of the extending roller unit vertically.

To be more precise, long guide rails 21 are respectively disposed in the front-rear direction in the vicinities of both left and right ends on an upper surface of the base plate 5, and left and right vertical frames 23 of the slide stand 19 are movably supported on the left and right guide rails 21 through slide guides 25. The left and right vertical frames 23 are connected integrally with each other by use of a connecting member 27 (see FIG. 4) formed into a long shape in the left-right direction and connected integrally with each other by use of a connecting bracket 29 disposed to stride over the inclined transporting unit 7. Moreover, this connecting bracket 29 is provided with a flouring device 31 for sprinkling (spraying) flour or the like on the food dough 9 transported by the inclined transporting unit 7.

Usually, the slide stand 19 is positioned to abut on a support plate 33 integrally installed upright at a front end of the base plate 5. As described previously, when the slide stand 19 is positioned to abut on the support plate 33, the slide stand 19 is fixably and releasably fixed by an appropriate locking unit (not shown) such as a so-called catch lock.

Therefore, when cleaning around an upper portion of the inclined transporting unit 7, the horizontal direction transporting unit 11 or the like, it is possible to move the slide stand 19 backward along the guide rails 21 while releasing fixation by the locking unit. When the slide stand 19 is moved backward as described above, the extending roller unit 13 supported by the slide stand 19 is also integrally moved backward, thereby uncovering the vicinity of the upper portion of the inclined transporting unit 7, an upper side of the horizontal direction transporting unit 11, and the like. Accordingly, it is possible to clean the vicinity of the upper portion of the inclined transporting unit 7, the horizontal direction transporting unit 11, and the like easily.

Figure 3:
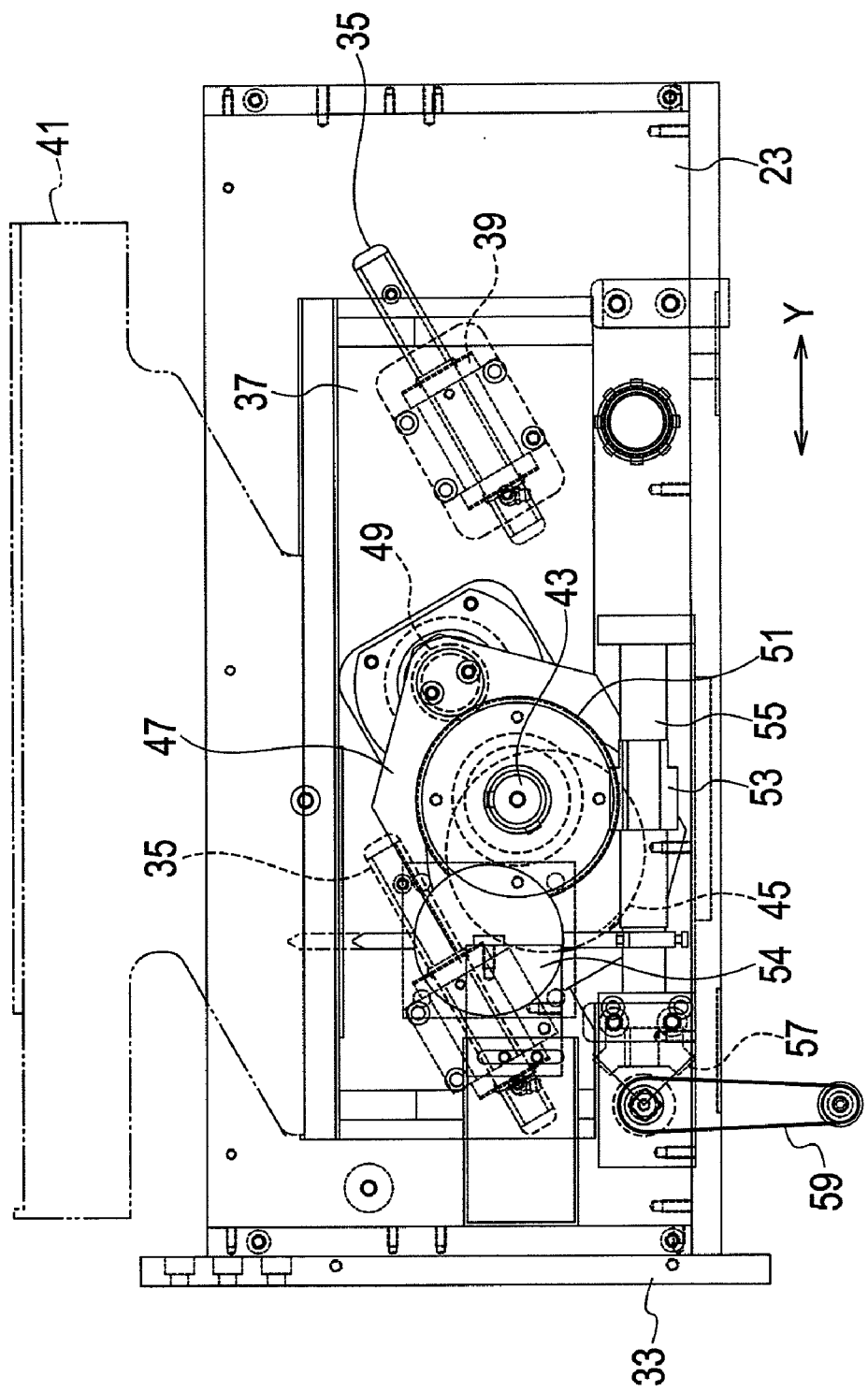
FIG. 3 is an explanatory right side view of a main part showing a configuration for adjusting a position of an extending roller unit vertically.

In order to move the extending roller unit 13 vertically relative to the slide stand 19, outer side surfaces in the left-right direction of the vertical frames 23 are provided with guide members 35 (see FIGS. 1 and 3) inclined so that one end thereof is higher than the other end, the one end facing the inclined transporting unit 7 in a direction intersecting the direction of inclination of the inclined transporting unit 7.

Meanwhile, left and right elevating plates 37 are supported vertically movably by these guide members 35 via slide guides 39. Moreover, support brackets 41 for supporting the extending roller unit 13 are integrally provided on the left and right elevating plates 37.

In order to vertically move the elevating plates 37 along the guide members 35, both ends of a rotating shaft 43 (see FIG. 4) which is long in the left-right direction is rotatably supported by the left and right vertical frames 23, and eccentric discs 45 are integrally attached to both ends of this rotating shaft 43. Moreover, link plates 47 to be displaced in a direction along the guide members 35 by rotation of the eccentric discs 45 are relatively rotatably engaged with the eccentric discs 45, and pin members 49 provided on the link plates 47 are engaged with bearings which are rotatably provided on the elevating plates 37. Here, a long hole or a slit (not shown) in a parallel direction to the guide member 35 is formed on each of the elevating plates 37 in order to avoid interference with the rotating shaft 43 that moves relatively.

According to the above described configuration, when rotating the rotating shaft 43 to rotate the eccentric discs 45, the link plates 47 are displaced in the direction along the guide members 35. Hence, the left and right elevating plates 37 are moved in obliquely vertical direction along the guide members 35.

To rotate the rotating shaft 43, a worm wheel 51 is integrally attached to one end of the rotating shaft 43 as appropriate. This worm wheel 51 is engaged with a worm 53 rotatably attached to the vertical frame 23. Moreover, a bevel gear 57 provided on an end of a worm shaft 55 having the worm 53 is engaged with another bevel gear (not shown) provided on a rotating shaft of a handle 59 which is rotatably supported by the vertical frame 23.

Therefore, the worm shaft 55 is rotated when the handle 59 is rotated appropriately, and then the worm wheel 51 is rotated via the worm 53 provided on this worm shaft 55. Hence the positions of the elevating plates 37 can be adjusted vertically by rotating the handle 59. Here, due to the engagement between the worm wheel 51 and the worm 53, the worm 53 will note be rotated by the worm wheel 51. Hence it is possible to fix and maintain the elevating plates at vertically adjusted positions without requiring any lock mechanisms and the like.

In order to detect an elevating position of the elevating plates 37 from a reference position (such as a bottom position of the elevating plates 37) when adjusting the elevating plates 37 vertically as described above, an elevating position detecting device 54 such as a dial gauge including a vertically movable sensing pin which abuts on part of the elevating plate 37 is provided on one of the vertical frames 23. Hence it is possible to detect an extending thickness when extending the food dough 9.

Figure 6:
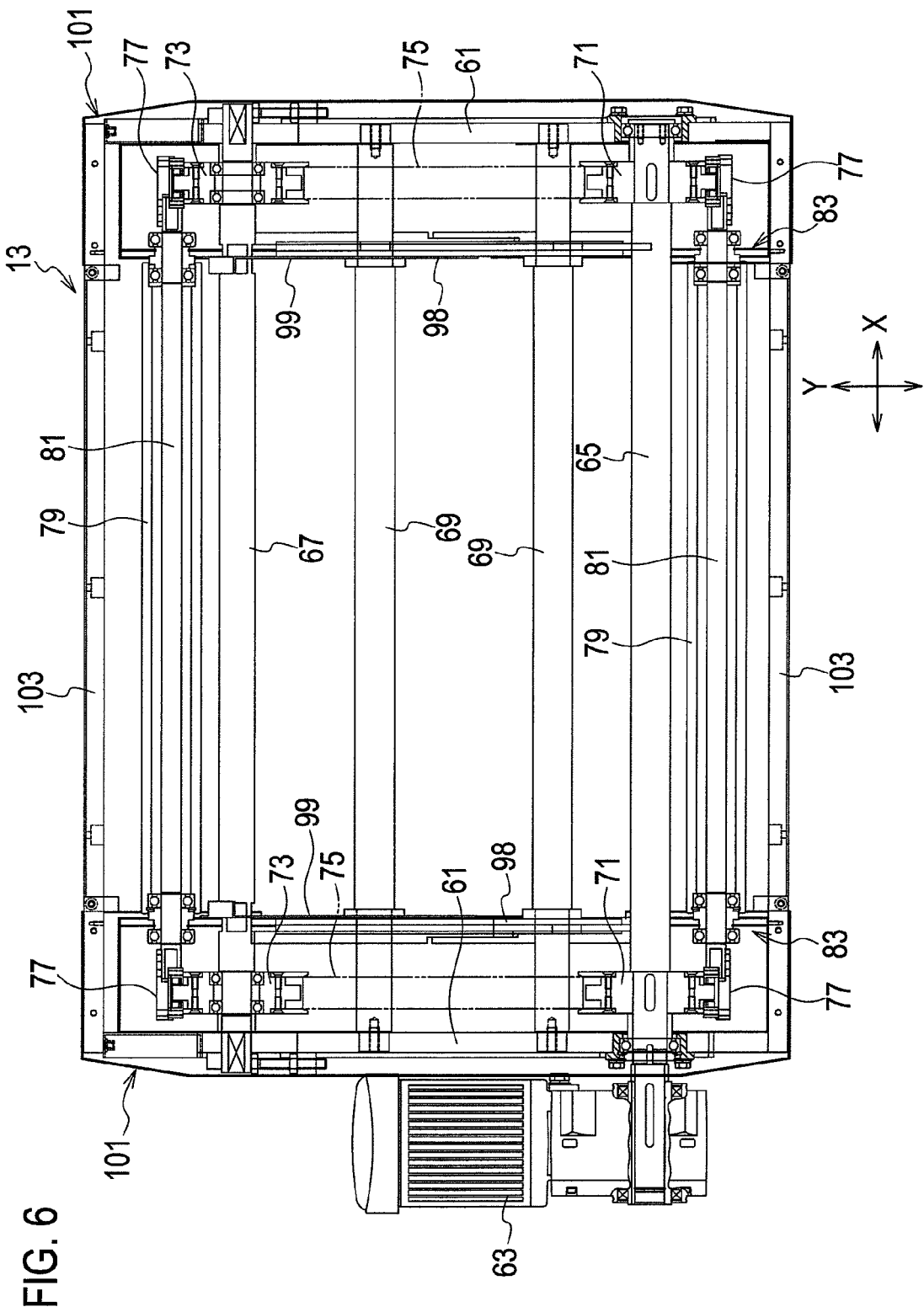
FIG. 6 is a horizontal sectional view showing the configuration of the extending roller unit.

The extending roller unit 13 supported by the left and right support brackets 41 has the configuration as described below. Specifically, as shown in FIG. 6, left and right bearing bases 61 which are long in the front-rear direction (the Y-axis direction) are integrally attached onto the left and right support brackets 41, and both left and right ends of a drive shaft 65 rotated by a drive motor 63 attached to the support bracket 41 on the left side are rotatably supported on front ends of the left and right bearing bases 61. Moreover, both left and right ends of a support shaft 67 are supported on rear ends of the left and right bearing bases 61 so as to be capable of adjusting positions in directions to approach and to recede from the drive shaft 65. Further, both end portions of an appropriate number of reinforcing bars 69 which are long in the left-right direction are integrally connected to an intermediate portion of the left and right bearing bases 61 in the front-rear direction thereof.

Drive pulleys 71 are integrally attached to both left and right ends of the drive shaft 65. Meanwhile, driven pulleys 73 are rotatably supported on both left and right ends of the support shaft 67. Moreover, the left and right endless members 75 such as timing belts or chains are wound around the drive pulleys 71 and the driven pulleys 73. Multiple shaft connecting members 77 are attached at even intervals on peripheral surfaces of these left and right endless members 75, and both ends of roller support shafts 81 for rotatably supporting extending rollers 79 formed into a pipe shape that are long in the left-right direction, are detachably connected to the left and right shaft connecting members 77.

Furthermore, left and right dust sealing mechanisms 83 for inhibiting (preventing) circulation of air between inside of a traveling region of the extending rollers 79 and inside of a traveling region of endless members 75 are provided between both end portions of the respective extending rollers 79 and the left and right pair of endless members 75. To be more precise, as shown in FIG. 7A, sleeves 85 located close to both end portions of the extending rollers 79 are provided on both left and right ends of the respective roller support shafts 81. Moreover, an opening 87A formed on one end of the link plate 87 having the other end rotatably supported by one of the sleeves 85 is rotatably engaged with an adjacent sleeve 85. Therefore, the multiple link plates 87 supported by the respective sleeves 85 are formed into an annularly connected shape on the whole as shown in FIG. 7B.

Figure 5:
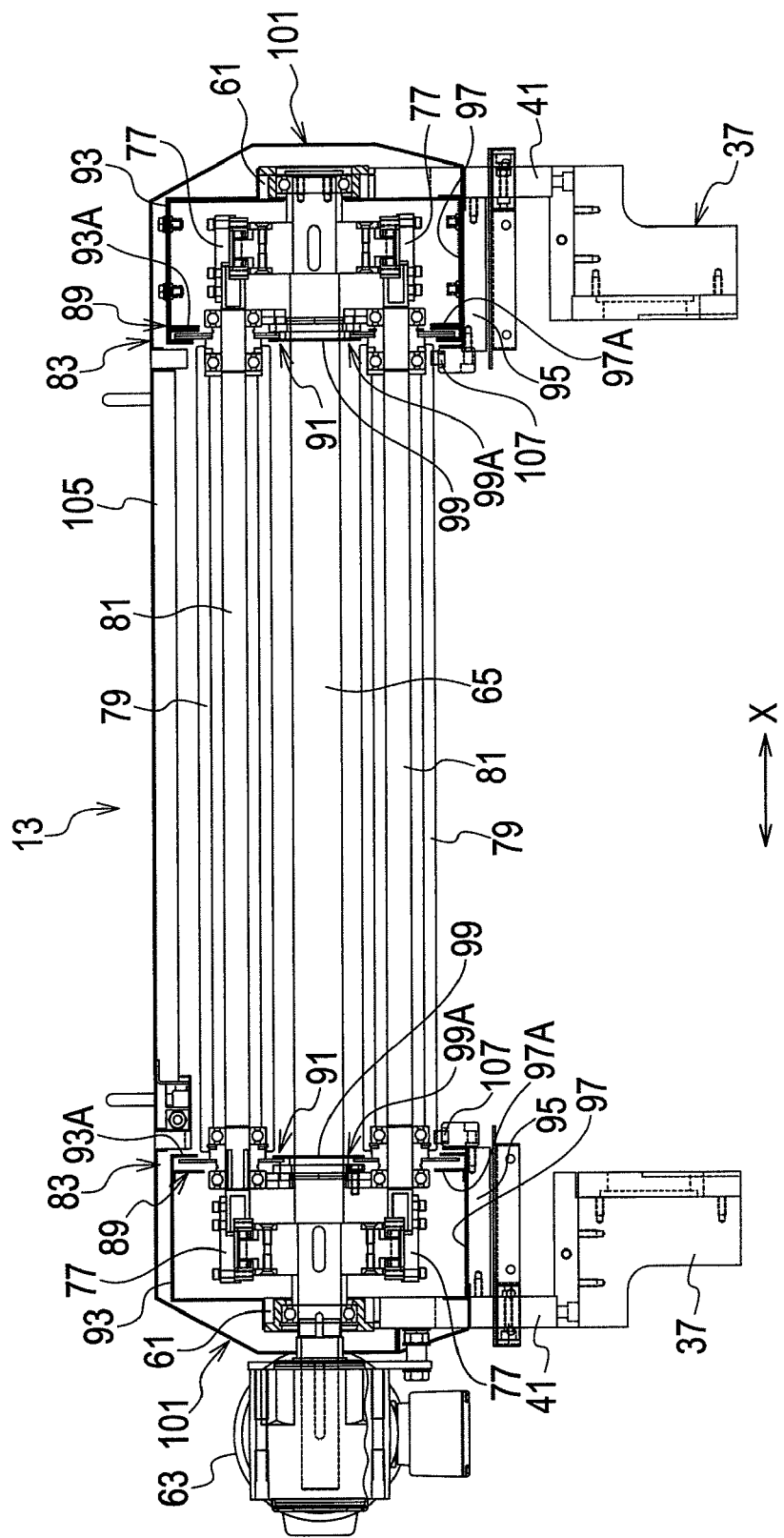
FIG. 5 is a vertical sectional view showing a configuration of the extending roller unit.

As described above, outer guide members 89 (see FIG. 5) and inner guide members 91 for guiding an outer circumference and an inner circumference of the multiple link plates 87 connected into the annular shape while holding the outer circumference and the inner circumference from both left and right sides are provided. To be more precise, upper covers 93 formed into a square U-shape by uncovering lower ends of inner end edges 93A in the left-right direction are attached to the left and right bearing bases 61 so as to hold upper sides of the outer circumference of the multiple link plates 87 connected into the annular shape as shown in FIG. 5. Meanwhile, left and right brackets 95 protruding inward are provided inside the left and right support brackets 41, and lower covers 97 formed into a square U-shape by uncovering upper ends of inner end edges 97A in the left-right direction are attached to upper faces of the left and right brackets 95 so as to hold lower sides of the outer circumference of the multiple link plates 87 connected into the annular shape. Further, front and rear covers (not shown) having inner end edges formed into a square U-shape so as to hold the outer circumference of arc portions on front and rear sides of the link plates 87 connected into the annular shape are provided so as to be connected to the upper and lower covers 93 and 97.

According to the above-described configuration, the drive pulleys 71, the driven pulleys 73, the endless members 75, and the like on the left and right sides are located inside spaces enclosed by the upper and lower covers 93 and 97 as well as the front and rear covers.

The internal guide members 91 for guiding the inner circumference of the multiple annularly-connected link plates 87 while holding the inner circumference from both left and right sides are configured as described below. Specifically, each cover plate 98 (see FIG. 6) is long in the front-rear direction and is supported by either of ends of the reinforcing bars 69. Both upper and lower end edges of the cover plate 98 are provided with square U-shaped openings (details not shown) for guiding the inner circumference of the multiple annularly-connected link plates 87 while holding the inner circumference from the left-right direction. Moreover, end cover plates 99 each having a square U-shaped opening 99A in its arc-shaped outer peripheral edge are integrally connected and fixed to both front and rear ends of each of the cover plates 98 (the connection state not shown in details). The square U-shaped opening 99A is configured to hold the inner circumference in arc shapes of the multiple annularly-connected link plates 87 from either of the left and right sides and guiding the inner circumference.

As understood already, the drive pulleys 71, the driven pulleys 73, the endless members 75, and the like are surrounded by the upper and lower covers 93 and 97 as well as the front and rear covers, and are enclosed by the cover plates 98, the end cover plates 99, and the multiple link plates 87 connected into the annular shape. That is, the traveling regions of the endless members 75 are enclosed by the multiple covers and cover plates and are maintained in the state of preventing (inhibiting) easy circulation of the air to and from the traveling regions of the extending rollers 79 that are caused to revolve by means of movement of the endless members 75.

Accordingly, flour dust does not fall on the endless members 75 and the like when performing an extending operation on the food dough 9 by use of the extending rollers 79. Moreover, the dust coming off the endless members 75 does not fall on the extending rollers 79 and the like.

Here, the left and right upper covers 93 and the like are covered with left and right main body covers 101 attached to the support brackets 41 while both front and rear sides of the traveling regions of the extending roller 79 are covered with front and rear covers 103 (see FIG. 6) provided between both front and rear portions of the main body covers 101. Moreover, upper portions of the traveling regions of the extending rollers 79 are covered with openable covers 105 (see FIG. 5) openably provided in the front-rear direction relative to the front and rear covers 103 by use of hinge pins. That is, the front-rear direction and the upward direction of the traveling regions of the extending roller 79 are normally enclosed by the front and rear covers 103 and the openable covers 105.

Here, the brackets 95 are provided with contact bars 107 (see FIG. 5) which are long in the front-rear direction and which are for rolling the extending rollers 79 so as to allow the extending rollers 79 to rotate and extend the food dough 9 at the time of revolution.

In the above-described configuration, the flour is sprinkled from the flouring device 31 in the course of transportation onto the food dough 9 placed on the inclined transporting unit 7. Thereafter, when the food dough 9 is transported to the vicinity of an upper portion of the inclined transporting unit 7, the food dough 9 is interposed between the inclined transporting unit 7 and the extending rollers 79, which revolve horizontally by way of the extending roller unit 13 and which rotates while contacting the contact bars 107. Hence the food dough 9 is transported to the horizontal direction transporting unit 11 and is subjected to the extending operation. In this case, the flour or the like does not enter the traveling regions of the endless members 75 as dust. Moreover, the dust or the like generated in the traveling regions of the endless members 75 does not enter the traveling regions of the extending rollers 79.

When performing the extending operation on the food dough 9 as described above, by adjusting a vertical position of the extending roller unit 13 in accordance with the thickness of the food dough 9 transported by the inclined transporting unit 7, the extending roller unit 13 is adjusted in the obliquely vertical direction along the inclined guide members 35 as described previously. Specifically, when the food dough 9 is still thick, the extending roller 13 is lifted obliquely so as to protrude toward the inclined transporting unit 7 by adjusting the vertical position of the extending roller unit 13 in the obliquely upward direction.

Accordingly, a clearance in the vertical direction between the inclined transporting unit 7 and the extending roller unit 13 for interposing (holding) the food dough 9 is increased, and a range of the extending operation while holding the food dough 9 by use of the inclined transporting unit 7 and the extending roller unit 13 becomes longer. In other words, the clearance for a compressing and sending region for compressing the food dough 9 between the extending roller unit 13 and the inclined transporting unit 7 and for sending the food dough 9 toward the horizontal direction transporting unit 11 is increased, and the compressing and sending region becomes longer in the front-rear direction at the same time.

Accordingly, it is possible to suppress a tendency that the thick food dough 9 is lifted up in the vicinity of an entrance between the extending roller unit 13 and the inclined transporting unit 7 and to suppress rapid thinning of the thick food dough 9, i.e., to suppress a change rate of the thickness to a small level. In this way, it is possible to suppress an increase in an internal stress of the food dough 9 at the time of the extending operation.

Here, the extending operation on the food dough 9 is achieved by use of a difference in the transporting speed between the inclined transporting unit 7 and the horizontal direction transporting unit 11 and by use of a pressurizing operation of the extending rollers 79 which are rolled on an upper surface of the food dough 9. Moreover, upon completion of the extending operation on the food dough 9, it is possible to uncover the vicinity of the upper end of the inclined transporting unit 7 and the upper side of the horizontal direction transporting unit 11 by moving the extending roller unit 13 in the leftward direction in FIG. 1 as described previously. Hence it is possible to perform maintenance check, cleaning, and the like easily.

Figure 8:
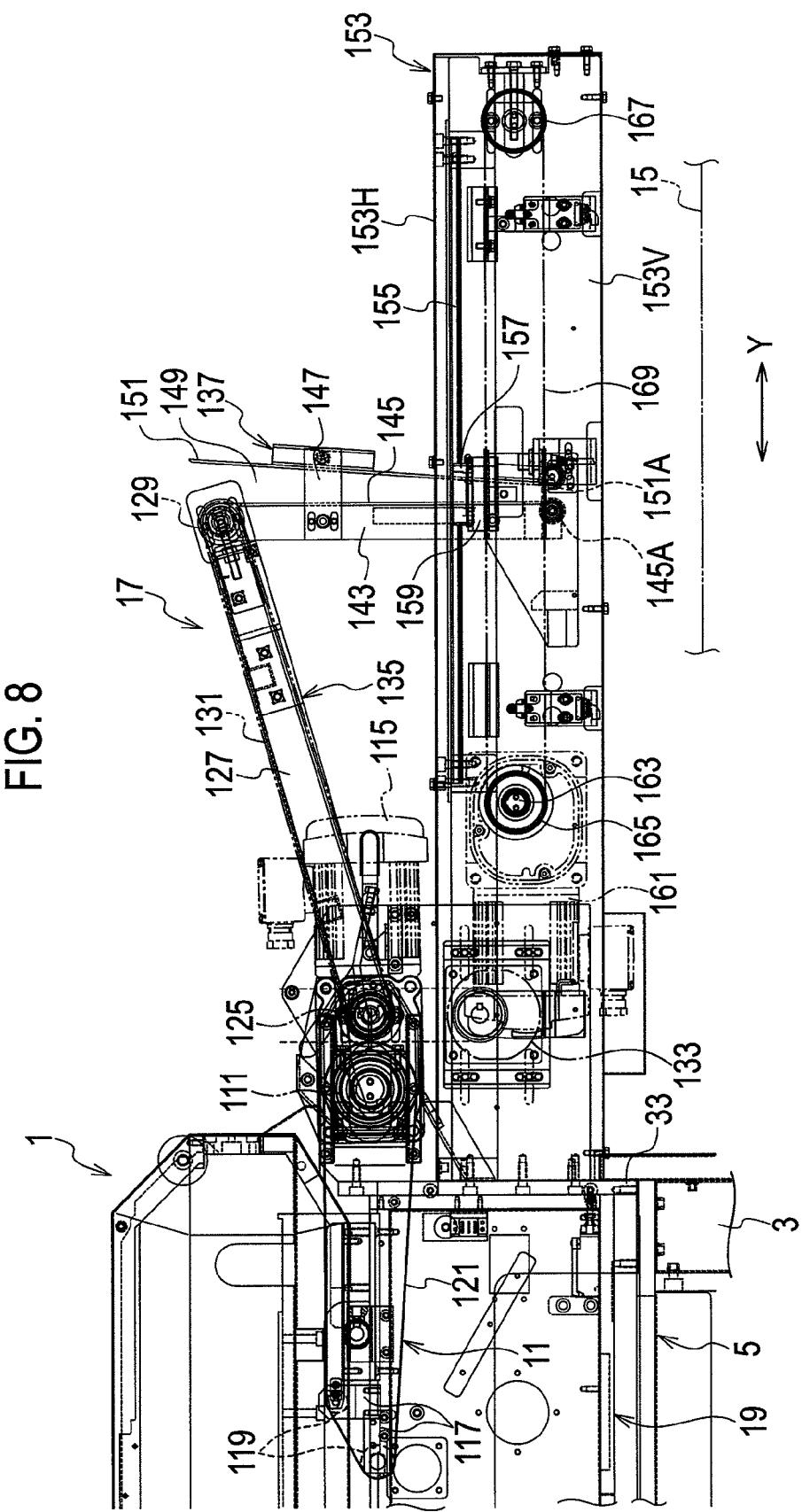
FIG. 8 is an explanatory left side view showing main part of a lapping apparatus.
Figure 9:
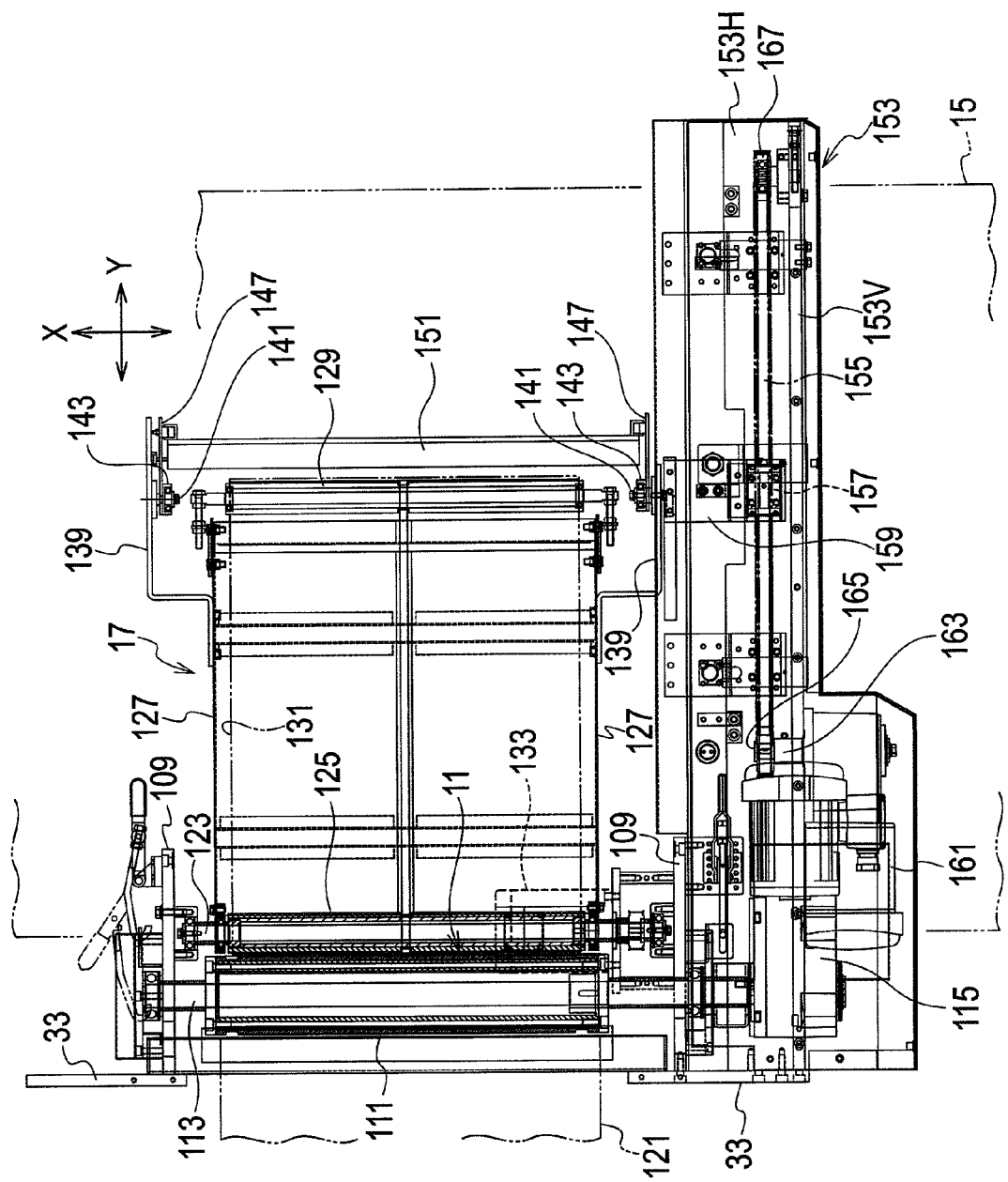
FIG. 9 is an explanatory plan view showing the main part of the lapping apparatus.

The horizontal direction transporting unit 11 is formed of a belt conveyor and is supported by the support plate 33 installed upright at the base plate 5. To explain further on this horizontal direction transporting unit 11, left and right support brackets 109 (see FIG. 9) protruding to the downstream side are integrally provided on the support plate 33, and both left and right ends of a rotating shaft 113 integrally provided with a roller 111 are rotatably supported by this support brackets 109. Moreover, one end of the rotating shaft 113 is interlocked and connected to a motor 115 which is attached to one of the support brackets 109. Furthermore, a conveyor belt 121 is wound around the roller 111 and a roller 119 supported by a roller bracket 117 (see FIG. 8) provided to protrude from the support plate 33 toward an upstream side.

Therefore, by driving the motor 115, the conveyor belt 121 in the horizontal direction transporting unit 11 transports the extended strip-shaped food dough 9 toward the lapping apparatus 17.

The lapping apparatus 17 for lapping the food dough 9 onto the transporting unit 15 has a configuration to be described below. The food dough 9 undergoes the extending operation by the extending rollers 79 provided on the extending roller unit 13 and thus is extended into the thin strip shape (the sheet shape).

Specifically, the lapping apparatus 17 is provided on the downstream side (on the right side in FIGS. 8 and 9) of the horizontal direction transporting unit 11. Moreover, the lapping apparatus 17 for lapping the strip-shaped food dough 9 transported (conveyed) by the horizontal direction transporting unit 11 onto the transporting unit 15 includes a roller shaft 123 located in the vicinity of the roller 111 in the horizontal direction transporting unit 11. Here, both left and right ends of the roller shaft 123 are rotatably supported by the left and right support brackets 109.

A roller 125 is integrally provided on this roller shaft 123. Meanwhile, base portions of left and right swing arms 127 swingable in the vertical direction are swingably supported on both ends of the roller shaft 123. Moreover, a conveyor belt 131 is wound around the roller 125 and a driven roller 129 rotatably supported on tip ends of the left and right swing arms 127. To rotate the conveyor belt 131, a motor 133 attached to one of the support brackets 109 is interlocked and connected to the roller shaft 123 via a belt, a chain, and the like.

As understood from the above-described configuration, the swing arms 127 and the conveyor belt 131 constitute a swing conveyor 135 which is vertically swingable. A swing guide member 137 provided to be swingable in the horizontal direction as well as in a direction (an orthogonal direction, the front-rear direction) intersecting the transportation direction of the transporting unit 15 is provided on a tip end of this swing conveyor 135. This swing guide member 137 is configured to perform an operation to guide the strip-shaped food dough 9 falling off (flowing down) from the tip end of the swing conveyor 135 onto the transport surface of the transporting unit 15.

To be more precise, the left and right swing arms 127 are provided with left and right support brackets 139 located outward of both ends of the driver roller 129, and the left and right support brackets 139 are respectively provided with left and right support shafts 141 located coaxially with the driver roller 129. Moreover, upper ends of left and right swing brackets 143 are supported by the left and right support shafts 141, whereby the swing brackets 143 are provided to be swingable around the support shafts 141 in the Y-axis direction (the front-rear direction).

Further, both left and right ends of a guide plate 145 large in size in the vertical and left-right directions are connected integrally to the left and right swing brackets 143 by bolts and the like with brackets and the like interposed therebetween. Meanwhile, a bracket 147 protruding forward is attached to a middle portion, in the longitudinal direction, of each of the left and right swing brackets 143. A guide plate 151 is attached to the bracket 147 to face the guide plate 145. The guide plate 151 forms a flow-down clearance 149 with the guide plate 145, and is capable of adjusting the width of the flow-down clearance 149. The flow-down clearance 149 allows the strip-shaped food dough 9 to flow down between the guide plate 145 and the guide plate 151. Guide rollers 145A and 151A which are rotatable in contact with the strip-shaped (sheet-shaped) food dough 9 that falls through the flow-down clearance 149 are provided rotatably on lower ends of the guide plates 145 and 151 facing each other in the front-rear direction.

In order to swing the swing guide member 137 horizontally in the front-rear direction (the Y-axis direction), a protruding frame 153 is provided to significantly protrude forward from the support plate 33. This protruding frame 153 is provided to intersect a position above the transporting unit 15 at right angles to the transportation direction of the transporting unit 15. This protruding frame 153 includes a vertical wall portion 153V and an upper horizontal wall portion 153H. Accordingly, a vertical sectional shape of the protruding frame 153 is an inverted L-shape.

Moreover, a guide rail (a guide member) 155 which is long in the front-rear direction (the Y-axis direction) is horizontally attached to a lower surface of the horizontal wall portion 153H, and a slider 157 movably supported by this guide rail 155 is connected to one of the swing brackets 143 via a connecting member 159. Moreover, a motor 161 is attached to a rear end of the vertical wall portion 153V of the protruding frame 153, and a drive pulley 165 is integrally attached to a drive shaft 163 rotated by this motor 161. Further, an endless member 169 such as a timing belt is wound around the drive pulley 165 and a driven pulley 167 provided rotatably on a tip end of the vertical wall portion 153V. This endless member 169 is connected relatively rotatably to the slider 157 by use of an appropriate connecting member.

Accordingly, when the motor 161 is rotated back and forth, the endless member 169 is rotated back and forth and the slider 157 is reciprocated in the front-rear direction along the guide rail 155. Hence, a lower portion of the swing guide member 137 is caused to swing horizontally in the front-rear direction in conjunction with reciprocation of the slider 157. That is, the motor 161, the endless member 169, and the like constitute a tip portion reciprocating unit for reciprocating the lower end (the tip end) of the swing guide member 137.

Here, by controlling forward and backward rotation of the motor 161 under control of a control device (not shown), it is possible to control positions of reciprocations of the slider 157 which reciprocates in the front-rear direction and a stroke length of the reciprocation.

As understood from the above-described configuration, the strip-shaped food dough 9 transported to the downstream side by the horizontal direction transporting unit 11 is conveyed to the swing conveyor 135 in the lapping apparatus 17. Thereafter, the food dough 9 falling from the tip end of the swing conveyor 135 flows down through the flow-down clearance 149 in the swing guide member 137. When the lower part of this swing guide member 137 moves from a vertical state to the forward direction (the right direction in FIG. 8), the food dough 9 is guided by the guide plate 145 and the guide roller 145A and is then lapped onto the transport surface of the transporting unit 15. Meanwhile, when the lower part of the swing guide member 137 moves from the vertical state to the backward direction, the food dough 9 is guided by the guide plate 151 and the guide roller 151A and is then lapped onto the transporting unit 15.

That is, by repeatedly swinging the swing guide member 137 in the front-rear direction, it is possible to repeatedly lap the strip-shaped food dough 9 continuously conveyed, onto the transporting unit 15 while being lapped in the front-rear direction.

When lapping the food dough 9 onto the transporting unit 15 as described above, the swing conveyor 135 swings vertically but a dimension of the clearance between the tip end (the lower end of the swing guide member 137 and the transport surface of the transporting unit 15 is always maintained at a constant value. Therefore, a length from the roller 125 at the base end of the swing conveyor 135 to the transport surface of the transporting unit 15 for lapping the food dough 9 is always maintained at substantially a constant value. Accordingly, it is possible to prevent tension or relaxation to the food dough 9 when lapping the food dough 9 onto the transporting unit 15 while swinging the swing guide member 137 in the front-rear direction.

The entire contents of Japanese Patent Application No. 2009-053108 (filed on Mar. 6, 2009) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

REFERENCE SIGNS LIST

1 Food Dough Extending Apparatus
5 Base Plate
7 Inclined Transporting Unit
9 Food Dough
11 Horizontal Direction Transporting Unit
13 Extending Roller Unit
15 Transporting Unit
17 Lapping Apparatus
19 Slide Stand
21, 155 Guide Rails
35 Guide Member
37 Elevating Plate
39 Slide Guide
41 Support Bracket
43 Rotating Shaft
45 Eccentric Disc
49 Pin Member
51 Worm Wheel
53 Worm
59 Handle
63 Drive Motor
65 Drive Shaft
67 Support Shaft
69 Reinforcing Bar
71, 165 Drive Pulleys
73, 167 Driven Pulleys
75, 169 Endless Members
79 Extending Roller
83 Dust Sealing Mechanism
85 Sleeve
87 Link Plate
87A, 99A Openings
89 External Guide Member
91 Internal Guide Member
93 Upper Cover
93A Inner End Edge
99 End Cover Plate
101 Main Body Cover
103 Front (Rear) Cover
105 Openable Cover
107 Contact Bar
111, 119, 125 Rollers
113 Rotating Shaft
121, 131 Conveyor Belts
127 Swing Arm
129 Driven Roller
135 Swing Conveyor
137 Swing Guide Member
143 Swing Bracket
145, 151 Guide Plates
145A, 151A Guide Rollers
149 Flow-Down Clearance
153 Protruding Frame
153V Vertical Wall Portion
153H Horizontal Wall Portion
157 Slider

The invention claimed is:

1. A food dough extending apparatus, comprising:
an inclined transporting unit inclined and configured to transport to-be-extended food dough upward;
a horizontal direction transporting unit configured to transport the food dough transported from the inclined transporting unit in a horizontal direction; and
an extending roller unit provided above over an area from around an upper end of the inclined transporting unit to the horizontal direction transporting unit and configured to extend the food dough, wherein
the extending roller unit is vertically adjustable in a direction intersecting an inclination direction of the inclined transporting unit in a manner such that the extending roller unit is upwardly inclined toward the inclined transporting unit, and wherein
the extending roller unit is configured to be lifted obliquely so as to protrude toward the inclined transporting unit by adjusting the vertical position of the extending roller unit in the obliquely upward direction.

2. The food dough extending apparatus according to claim 1, wherein the extending roller unit comprises:
pipe-shaped extending rollers rotatably provided respectively on a plurality of roller support shafts, both ends of each of the roller support shafts being connected to a pair of rotatably movable endless members; and
dust sealing mechanisms provided between ends of the extending rollers and the pair of endless members, the dust sealing mechanisms inhibiting circulation of air between traveling regions of the extending rollers and traveling regions of the pair of endless members.

3. The food dough extending apparatus according to claim 2, wherein each of the dust sealing mechanisms comprises:
a plurality of link plates connected into an annular shape and each having both ends rotatably supported by two adjacent roller support shafts, respectively, among the plurality of roller support shafts;
an outer guide member configured to guide an outer circumference of the annularly connected link plates; and
an inner guide member configured to guide an inner circumference of the annularly connected link plates, thereby the outer guide member and the inner guide member guide the annularly connected link plates so as to hold the annularly connected link plates from the outer circumference and the inner circumference of the annularly connected link plates.

4. The food dough extending apparatus according to claim 1, wherein the extending roller unit is provided to be retractable toward the inclined transporting unit to uncover an upper side of the horizontal direction transporting unit.

5. The food dough extending apparatus according to claim 1, further comprising:
a swing conveyor provided downstream of the horizontal direction transporting unit so as to be swingable in a vertical direction, and configured to convey the extended food dough in a direction identical to the transportation direction of the food dough by the horizontal direction transporting unit;
a swing guide member provided on a tip end of the swing conveyor so as to be swingable in the horizontal direction in order to lap the food dough conveyed from the swing conveyor onto a transport surface of a transporting unit for transporting the food dough in a direction intersecting the transportation direction of the food dough by the swing conveyor, the swing guide member including a lower end reciprocable in a direction being horizontal and intersecting a transportation direction of the transporting unit; and
a guide member configured to guide the lower end of the swing guide member in the horizontal direction.

* * * * *